(12) United States Patent
Ritchie

(10) Patent No.: US 7,960,654 B2
(45) Date of Patent: Jun. 14, 2011

(54) CONNECTORS

(75) Inventor: Thomas Stuart Ritchie, Hamilton (NZ)

(73) Assignee: Gallagher Group Limited, Hamilton (NZ)

( * ) Notice: Subject to any disclaimer, the term of this patent is extended or adjusted under 35 U.S.C. 154(b) by 748 days.

(21) Appl. No.: 11/418,789

(22) Filed: May 5, 2006

(65) Prior Publication Data

US 2006/0270264 A1   Nov. 30, 2006

(30) Foreign Application Priority Data

May 6, 2005   (NZ) ........................................ 539917

(51) Int. Cl.
*H01B 17/06* (2006.01)
*E04H 17/10* (2006.01)

(52) U.S. Cl. .............. 174/163 F; 174/161 F; 174/158 F; 174/158 R; 256/47; 256/10

(58) Field of Classification Search ................ 174/45 R, 174/158 R, 158 F, 161 F, 163 R, 163 F, 164, 174/166 R, 169, 172, 135, 161 R; 256/DIG. 3, 256/10, 1, 3, 32, 42, 47, 54–56; D13/129; 439/326, 296, 325

See application file for complete search history.

(56) References Cited

U.S. PATENT DOCUMENTS

| 3,820,758 | A | * | 6/1974 | Berg et al. | 174/163 F |
|---|---|---|---|---|---|
| 4,049,905 | A | * | 9/1977 | Maranell | 174/163 F |
| 4,077,611 | A | * | 3/1978 | Wilson | 256/10 |
| D248,750 | S | * | 8/1978 | Langlie et al. | 174/158 F |
| D248,850 | S | * | 8/1978 | Berg et al. | 174/158 F |
| 5,959,255 | A | * | 9/1999 | Langlie et al. | 174/161 F |
| D416,859 | S | * | 11/1999 | Langlie et al. | D13/129 |
| 6,296,233 | B1 | * | 10/2001 | Berg et al. | 174/158 F |
| 7,216,852 | B2 | * | 5/2007 | Gravelle | 256/10 |

OTHER PUBLICATIONS

Exhibit 1 showing a front elevational view of a connector in the prior art of unknown source and of unknown date.
Exhibit 2 showing a side elevational view of a connector in the prior art of unknown source and of unknown date.

* cited by examiner

*Primary Examiner* — Angel R Estrada
(74) *Attorney, Agent, or Firm* — Abelman, Frayne & Schwab

(57) ABSTRACT

A connector for support posts which have a plurality of divergent arms. The connector has four engagement sections. The first two are adapted to engage first and second divergent arms of the support post. A third engagement section is adapted to engage a third divergent arm. The fourth engagement section is adapted to engage the third divergent arm when not engaged by the third engagement section. The provision of third and fourth engagement sections adapts the connector for different sizes of support post.

16 Claims, 4 Drawing Sheets

CONNECTORS

TECHNICAL FIELD

This invention relates to improvements in or relating to connectors. In particular the present invention may be adapted to provide a connection system for an insulator which is to be connected to a support member with a plurality of divergent arms. In particular, reference will be made to the present invention being used to connect an insulator to a T-post for the purposes of securing an electric fence wire. However those skilled in the art should appreciate that other applications are also envisioned.

BACKGROUND ART

In a number of applications it is preferable to connect articles or loads to various forms of support members. For example, in the case of fencing systems connectors have been developed to connect electrical insulators to conductive metal fence posts.

The connectors developed for this type of application need to provide a secure connection to the support member or post involved, and should prevent the load attached to the post from sliding up or down, or rotating around the post.

One common form of support member used in fencing applications is the "T-post", which includes three divergent arms. The T-post has a centre arm which bisects a pair of front arms orientated in line with one another. The posts typically also have bumps or protrusions that project from the front arm of the T post. T-posts with this basic form have been developed and marketed in varying sizes and shapes depending on the particular application within which the post is to be used. For example, it is possible to obtain T-posts with the distance between the ends of the two front arms being 1 ¼ quarter inches, 1 ⅜ inches, and 1 ½ inches. It is particularly common for T-posts to have a variation in the length of the centre arm for a common or typical length of the two front arms.

As should be appreciated by those skilled in the art, it is difficult to design or provide a connector which can secure an insulator or other forms of load to different sizes of support member and in particular the different sizes of T-post discussed above.

Existing prior art connection systems, such as that disclosed in U.S. Pat. No. 4,049,905, have been designed for a single size of T-post. The construction and form of the connector disclosed do not fit securely to larger or smaller versions of the posts which it is to engage with. A different size and shape of connector is required for each size and shape of T-post.

This approach in turn increases manufacturing costs as multiple production lines need to be implemented for the multiple designs required, and also increases the storage and stock overheads of suppliers of such connectors. Furthermore, there is also some degree of confusion and complication for users of the connectors provided in that they must ensure they have the correct size connector for the post they will be working with.

An improved connector which addressed any or all of the above problems would be of advantage. In particular, a connector which could secure a load firmly to a range of shaped or sized posts would be of advantage. A connector which acts as a "universal" connector for various sizes of T-posts and prevents the load connected from sliding up and down the post, or spinning around the post would also be of advantage.

All references, including any patents or patent applications cited in this specification are hereby incorporated by reference. No admission is made that any reference constitutes prior art. The discussion of the references states what their authors assert, and the applicants reserve the right to challenge the accuracy and pertinency of the cited documents. It will be clearly understood that, although a number of prior art publications are referred to herein, this reference does not constitute an admission that any of these documents form part of the common general knowledge in the art, in New Zealand or in any other country.

It is acknowledged that the term 'comprise' may, under varying jurisdictions, be attributed with either an exclusive or an inclusive meaning. For the purpose of this specification, and unless otherwise noted, the term 'comprise' shall have an inclusive meaning—i.e. that it will be taken to mean an inclusion of not only the listed components it directly references, but also other non-specified components or elements. This rationale will also be used when the term 'comprised' or 'comprising' is used in relation to one or more steps in a method or process.

It is an object of the present invention to address the foregoing problems or at least to provide the public with a useful choice.

Further aspects and advantages of the present invention will become apparent from the ensuing description which is given by way of example only.

DISCLOSURE OF INVENTION

According to one aspect of the present invention there is provided a connector adapted to engage with a support member, said support member including a plurality of divergent arms, the connector including:

a first engagement section adapted to engage a first arm of the support member; and a second engagement section adapted to engage a second arm of the support member; and a third engagement section adapted to engage a third arm of the support member; and a fourth engagement section adapted to engage the third arm of the support member when said third arm is not engaged by the third engagement section.

The fourth engagement section is used to engage the third arm in place of the third engagement sections. This allows a longer arm to be accommodated because the fourth engagement section is further from the second engagement section than the third engagement section.

Preferably, the connector is adapted to engage a T-post.

Preferably the second and third engagement sections of the connector are separated by an adjustment section formed from a resilient material, the adjustment section being deformable to adjust the distance between the second and third engagement sections.

The adjustment section which is made of a resilient material is stretched or extended when a third arm of a suitable range of lengths is engaged in the third engagement section. The resilience of the extension section means that it tends to contract to provide a spring force to force the engagement section against the end of the arm. This acts to hold the T-post in the connector.

Preferably the connector includes a lead-in tab at an extremity of the connector.

The lead-in tab facilitates fitting of the connector to a post by providing a surface which slides past the arms of the post and forces the fourth engagement section out over the arm. Otherwise the outer edge of the fourth engagement section may catch on the arms making it more difficult to fit the connector to a post.

Preferably the connector includes bearing section between the second and third engagement sections, the bearing section being adapted to bear against the second arm of the support member engaged with the connector.

Preferably the connector includes a cantilever section which projects away from a support member engaged by the connector.

Preferably the connector includes a wire attachment at an end of the cantilever section capable of attaching a wire to the cantilever section to mount the wire cantilevered from the connector.

Preferably the adjustment section may include at least two angled sections.

Preferably the connector includes a bracing section disposed between the second engagement section and the adjustment section.

Preferably the third and fourth engagement sections of the connector are concave substantially towards the second engagement section when the connector is engaged with a support member.

Preferably the connector may include an electrically insulating material.

Preferably at least a portion of the connector is formed from a resilient material.

Preferably the resilient material of the connector is a plastic material.

According to another aspect of the present invention there is provided a connector adapted to engage with a support member, said support member including a plurality of divergent arms, the connector including:
a first engagement section adapted to engage a first arm of the support member; and
a second engagement section adapted to engage a second arm of the support member; and
a third engagement section adapted to engage a third arm of the support member;
wherein the second and third engagement sections are separated by an adjustment section formed from a resilient material, the adjustment section being deformable to adjust the distance between the second and third engagement sections.

According to a further aspect of the present invention there is provided a connector adapted to connect a wire to a support member, said support member including a plurality of divergent arms, the connector including:
a wire fastener adapted to locate a wire relative to the connector; and
a first engagement section adapted to engage a first arm of the support member; and
a second engagement section adapted to engage a second arm of the support member; and
a third engagement section adapted to engage a third arm of the support member; and
a fourth engagement section adapted to engage the third arm of the support member when said third arm is not engaged by the third engagement section.

Preferably wire fastener of the connector is formed from a cantilevered section which projects away from a support member engaged by the connector.

Preferably at least a portion of the connector is formed from an electrically insulating material.

The present invention may be adapted to provide a connector which can be used in a wide number and range of applications. Reference throughout this specification will in general be made to the connector provided being used to attach an electrical insulator to a support member or post. Such a connector may be engaged with a post to locate and secure an electrical insulator with respect to same.

Reference throughout the specification will also be made to the support member or post to which the connector is to be engaged having a plurality of divergent arms. The connector provided may engage in these divergent arms to secure an associated electrical insulator to the support member involved. Preferably, the support member to which the connector is to be engaged will be a T-post which is well known in the agricultural field. T-posts consist of three divergent arms with a centre arm bisecting two front arms orientated substantially parallel to and in line with one another.

Reference throughout this section will also be made to the present invention providing a connector for an electrical insulator to be attached to a T-post. However, those skilled in the art should appreciate that other applications are also envisaged and reference to the above only throughout the specification should in no way be seen as limiting.

The present invention may provide many potential advantages over the prior art.

The present invention may be used to provide a "universal" connector which can engage with a number of different shapes or sizes of support members. In particular, a connector formed in accordance with a preferred embodiment may engage with a number of different sizes or shapes of T-posts to secure or engage a load to same.

The provision of at least two engagement sections that may alternatively engage the third arm of the support member allows the connector to accommodate a variety of sizes of support member. The fourth engagement section may be disposed at a greater distance from the second engagement section. Therefore it will accommodate a larger support member. The third engagement section is disposed a shorter distance from the second engagement member.

Therefore, a shorter third arm will cause the same extension or stretch in the extension section to create a sufficient retaining force from the engagement section to the arm.

A lead-in tab provided near the third or fourth engagement section(s) facilitates fitting of the connector to a support member. Such a tab may provide a surface which if forced against an arm of the support member during fitting of the connector, will act to force the engagement section over the arm and prevent the outer or top side with the engagement section from catching on the arm of the support member.

BRIEF DESCRIPTION OF DRAWINGS

Further aspects of the present invention will become apparent from the following description which is given by way of example only and with reference to the accompanying drawings in which.

BEST MODES FOR CARRYING OUT THE INVENTION

Figure 1:
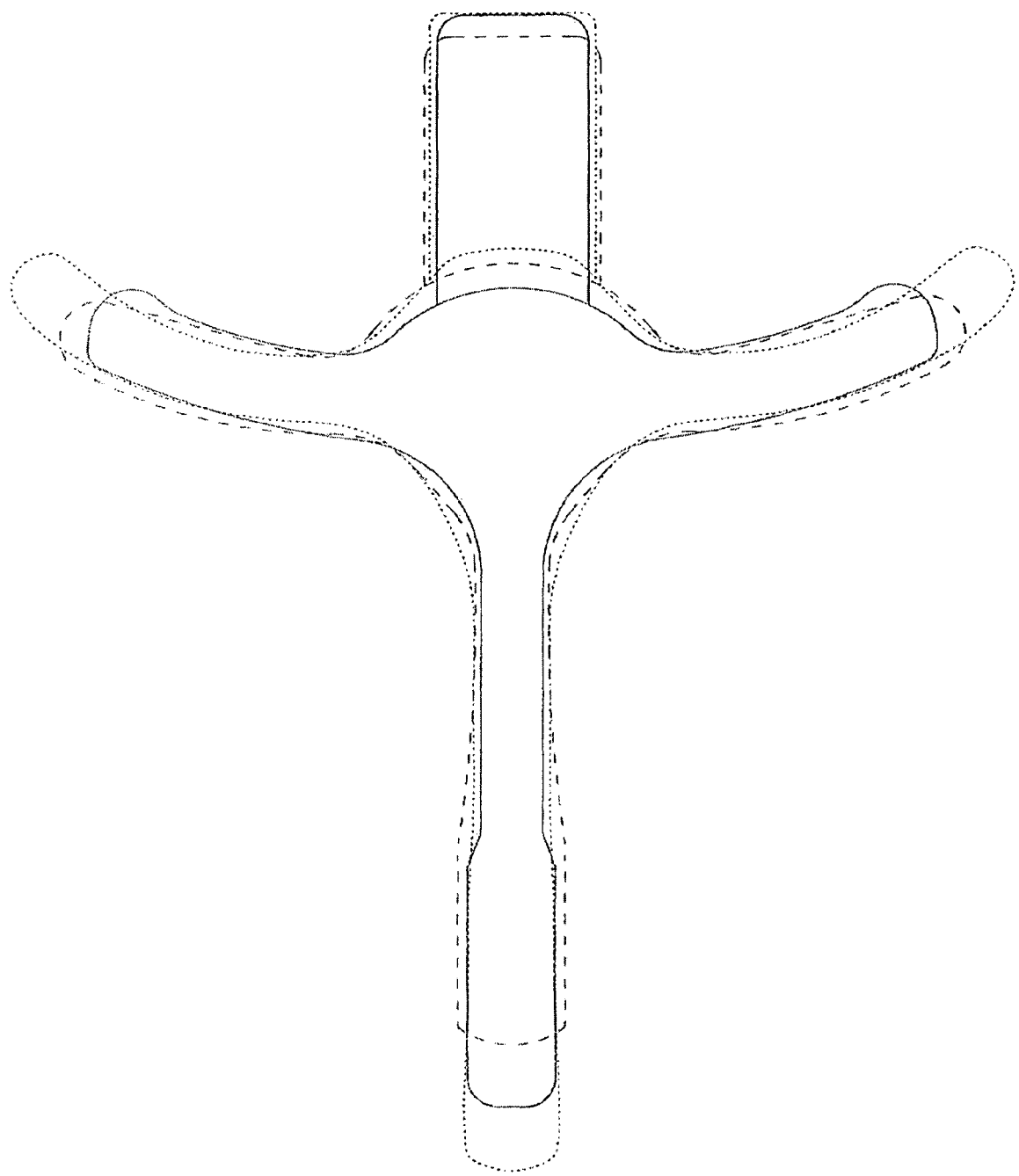
FIG. 1 shows a top view of three common sizes and shapes of T-post.

Typical variations in the size and shape of T-Posts are illustrated in FIG. 1. Three common T-posts are shown in birds eye view. Each T-post is shown with a different type of line: solid, coarse broken and fine broken.

As can be seen from FIG. 1, the size of the T-Post will dictate the length of its axis and the curvature portions of these arms.

Figure 2:
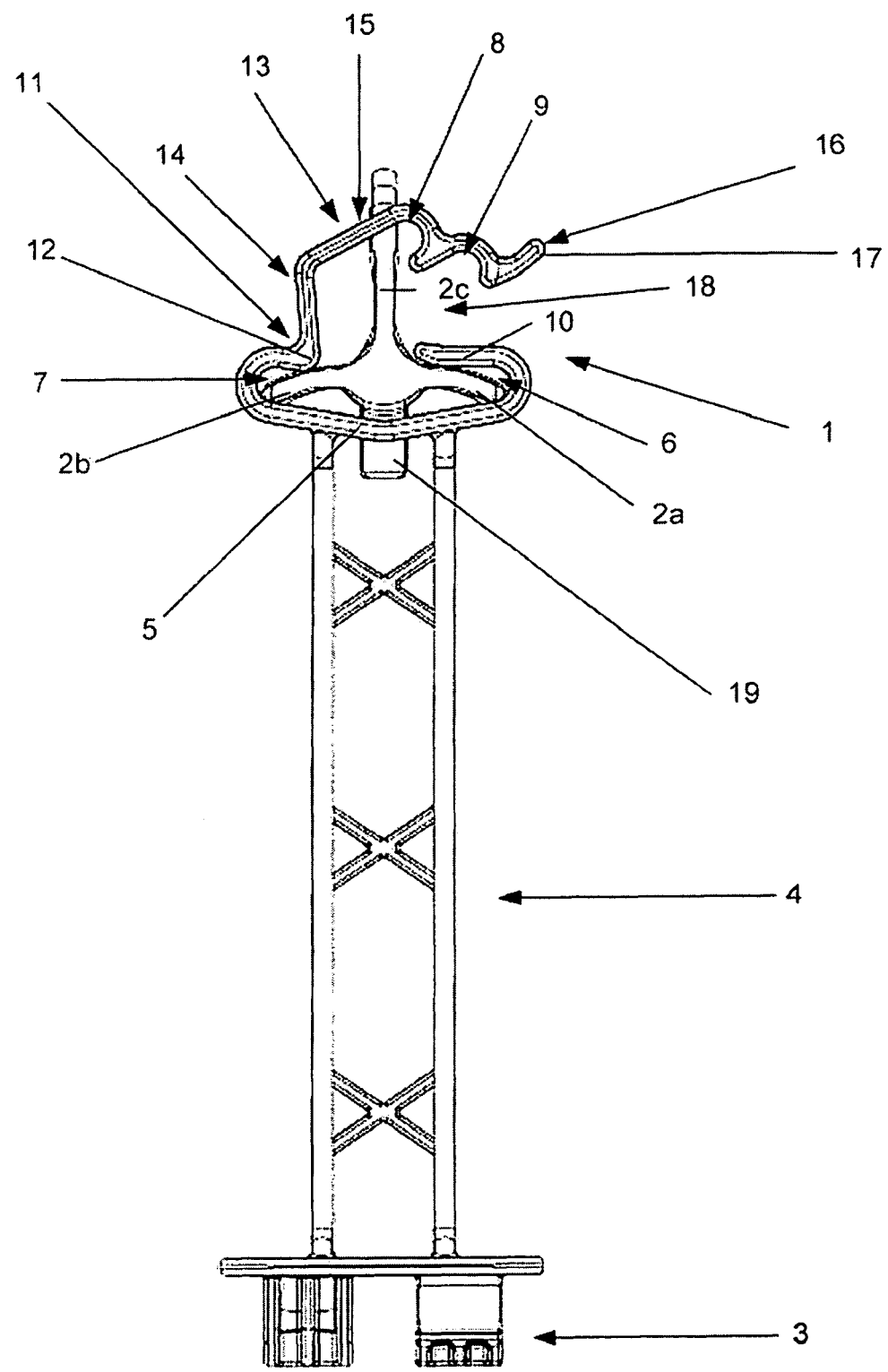
FIG. 2 shows a top view of a connector provided in accordance with the present embodiment in which the connector is in an un-deformed state with T-posts drawn in the background for reference.
Figure 4:
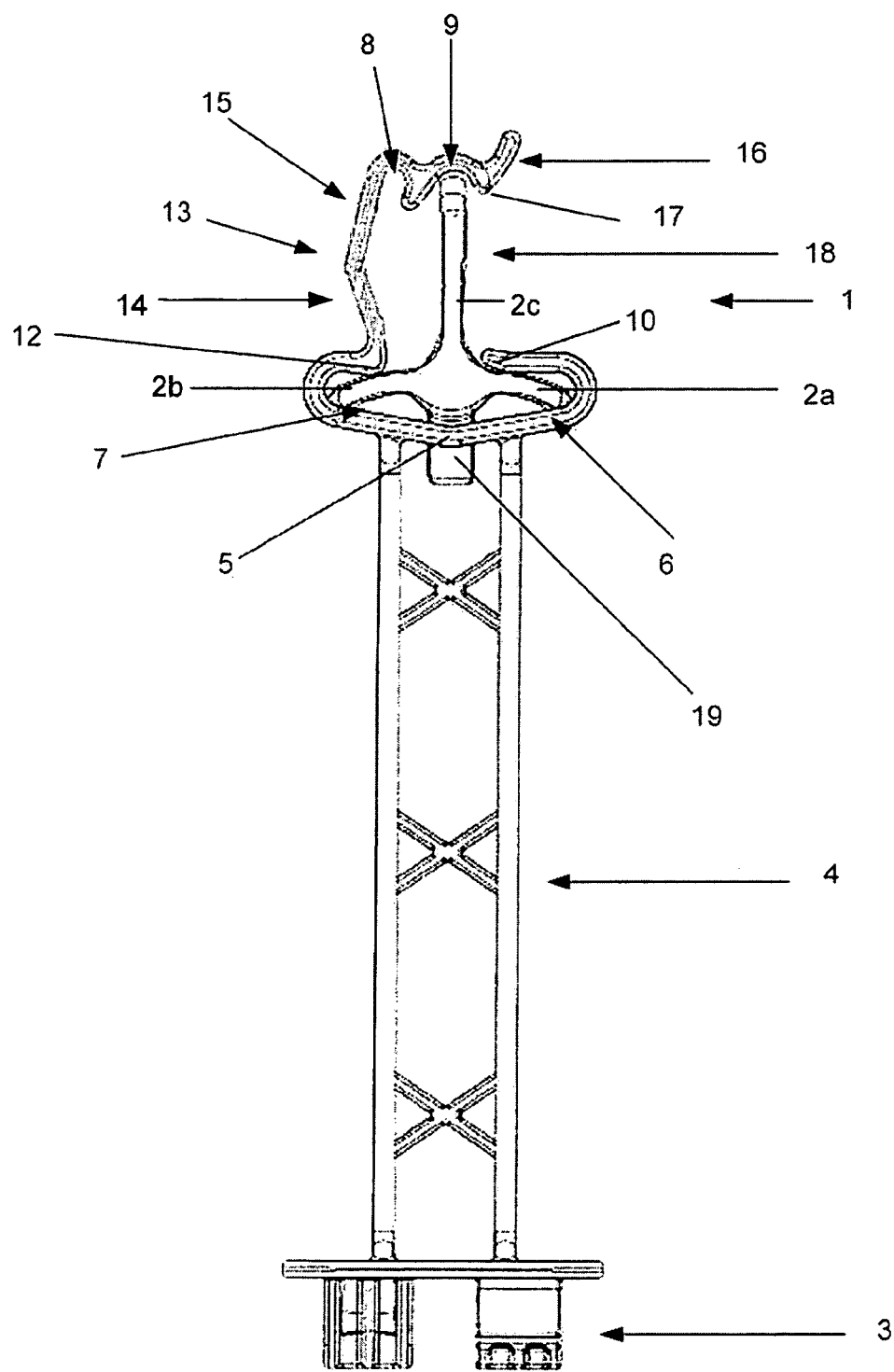
FIG. 4 shows a top view of the same connector of FIGS. 2 and 3 connected to a T-post support member.

FIG. 2 shows a top view of a connector provided in accordance with a preferred embodiment. The connector 1 is shown with the cross section of a T-post 2 support member in the background. In FIG. 2, the connector 1 is not connected to the T-post 2 and is therefore in an 'un-deformed state'. As used herein this term is intended to refer to the natural position of the connector when no forces, or stresses, are applied to it so no strain occurs. FIG. 4 shows the connector deformed to engage the post 2.

The connector 1 may engage with the T-post 2 to support a load formed from an electric fence wire fastener 3 which is separated from the T-post 2 by a cantilever member 4.

The connector 1 is formed from an electrically insulating material to prevent electrical current transmitted along the wire held by the wire fastener 3 from finding a path to ground through the T-post 2. It will be apparent to those s killed in the art that an alternative embodiment may have only a portion of the connector 1 formed from an electrically insulated material while still preventing electrical current from finding a path to ground.

As can be seen from FIGS. 2 and 4 the T-post 2 consists of a pair of front arms 2a, 2b which are bisected by a centre arm 2c.

FIGS. 2 and 4 illustrate three different possible lengths of centre arm 2c.

In the embodiment shown, the connector consists of a main body 5 which curves back on itself to provide concave recesses or engagement sections 6, 7, 8, 9 to accommodate ends of the arms 2a, 2b, 2c. The cross-section of the main body is relatively constant in this particular embodiment which is intended for use with a post 2 that has a relatively constant cross-section over the depth of the main body 5.

A first recess or engagement section 6 is formed from the main body 5 curving back from a contact surface 10 which, when the connector is fitted to a T-post, contacts the side of the arm and a section which extends to the second engagement section 7. As is clearly shown in FIGS. 2 to 3, the engagement sections 6 and 7 oppose each other to accommodate opposite arms 2a and 2b of a T-post.

The section extending between engagement sections 6 and 7 is, in this particular embodiment, consists of two sections angled relative. It will be apparent to those skilled in the art that the angled sections may serve the purpose of allowing for a ridge opposite the arm 2c and may serve the purpose of allowing the distance between engagement section 6 and 7 to be extended under stress to accommodate a range of lengths of arms 2a and 2b.

The centre or third arm 2c of the T-post 2 can be accommodated or engaged by either of the third and fourth engagement sections 8 or 9. The fourth engagement section 9 is disposed further from the third engagement section 7 than engagement section 8 and can therefore allow a larger centre arm 2c to be accommodated. The centre arm 2c can therefore be engaged by a choice of engagement sections 8 or 9 depending on the length of the centre arm 2c. It can be engaged by the fourth engagement section 9 if not engaged by the third engagement section 8, and vice versa.

The engagement section 7 is formed on one side by a doubled-back section 11 which provides a contact or bracing surface 12 which braces against a side of the arm 2b opposite from the arm 2c. The contact surfaces 10 and 12 act to provide a degree of retention of the arms 2a and 2b in the first and second engagement sections 6 and 7 and also assist the connector 1 bracing against the arms.

The connector 1 also includes a lead-in tab 16 which extends in an opposite direction, and at an obtuse angle, to the adjacent edge 17 of the engagement section 9. This lead in tab 16 acts to slide against arms 2b or 2c, when the connector 1 is being affixed to the T-post 2, and forces the edge 17 of the fourth engagement section 9 over the arms 2b or 2c.

The connector 1 has an adjustment section 13 between the second engagement section 7 and the third engagement section 8. This adjustment section extends from the doubled-back section 11 to the third engagement section 8 and, in this embodiment, consists of two angled sections 14 and 15. If the engagement section 8 or 9 is pulled in a direction away from the engagement section 7, the angled sections 14 and 15 become relatively more aligned so that the distance between the engagement sections 7 and 8 is increased. This allows adjustment for different lengths of centre arm 2c. The natural state of the angled sections 14 and 15 are relatively more angled than when the extension section 13 is extended and the material used in the connector is resilient so the extension section 13 is naturally biased, or sprung, towards the relatively short position. This means that straightening of the adjustment section effectively spring loads it to force the engagement sections 8 or 9 against the centre arm 2c.

The adjustment section therefore serves the purpose of accommodating a range of lengths of the centre arm 2c and also provides a spring force to force the adjustment sections 8 or 9 back down the axis of the arm 2c. This force, in addition to forces supplied by contact sections 10 and 12, assists in retaining the connector 1 on the T-post 2. In the un-deformed state shown in FIGS. 2 and 3 the engagement sections 8 and 9 face towards the engagement section 7 to provide the adjustment section 13 with a suitable degree of bias. Those skilled in the art will appreciate that some degree of spring force will be present due to the natural resilience of suitable materials even in the absence of the angled sections.

If the arm 2c is relatively shorter the third engagement section 2 will need to be used. Otherwise, an insufficient amount of straightening or stretch may be achieved if the fourth engagement section is used.

To affix the connector 1 to a T-post 2, a first wing 2a of the T-post 2 is inserted through an entrance 18 of the connector 1. At this time the connector would be rotated 180° relative to the post 2 from the position shown in FIGS. 2 and 4 so that the cantilever member is approximately aligned with the arm 2c.

The entrance 18 is then forced towards the end of the arm 2b. This will cause the tab 16 to slide against the side of the post extending from 2a to 2b and opposite the arm 2c to force the entrance 18 wider. The engagement sections 9 and 8 slide against the arm 2b as the connector is rotated, or wrapped, around the post 2. Next, the angled section 15 followed by angled section 14 would slide against the arm 2b. These are followed by the bearing surface 12. Finally the engagement section 7 slides over the end of the arm 2b to engage it as shown in FIG. 4.

During the latter stages of this action the lead-in tab 16 slides against the side of the arm 2c closest to the arm 2b. The tab 16 is forced upwards towards the end of the arm 2c and if the arm is short enough the tab 16 will slide over the end of the arm 2c so that the arm 2c is engaged by engagement section 9. If the arm is relatively longer, a force to the side of the adjustment section 13 towards the post would cause the adjustment section 13 to extend, with angled sections 14 and 15 becoming relatively more aligned, and the tab 16 would be forced to slide over the end of the arm 2c. If the arm 2c is relatively shorter, a similar force applied to adjustment section 13 would cause the end of the arm 2c to slide past the engagement section 9 and into the engagement section 8.

When the arm 2c is held in either engagement section 8 or 9 the resilient nature of the material used in the extension section 13 will act to contract the adjustment section 13 so that the engagement sections 8 or 9 are forced against the end of the arm 2c to hold the connector 1 firmly in place around the post 2.

When a wire or similar load is attached to the wire fasteners 3, the cantilever section member 4 will be cantilevering this load out from the post 2. This will tend to rotate the cantilever member and connector about an axis approximately in the centre of the post 2 as viewed in FIGS. 2 and 4 and in the plane of the arm 2c. This rotation is prevented by the force applied by third or fourth engagement sections 8 or 9 to the end of the arm 2c. This force is augmented by similar forces applied by contract sections 10 and 12 to the backs of the arms 2a and 2b.

These forces and friction between the connector 1 and the post 2 also act to prevent the connector 1 sliding down the post 2. Also the connector may be located between bumps or protrusions 19 on the post 2 which also stop the connector 1 from moving up or down.

Figure 3:
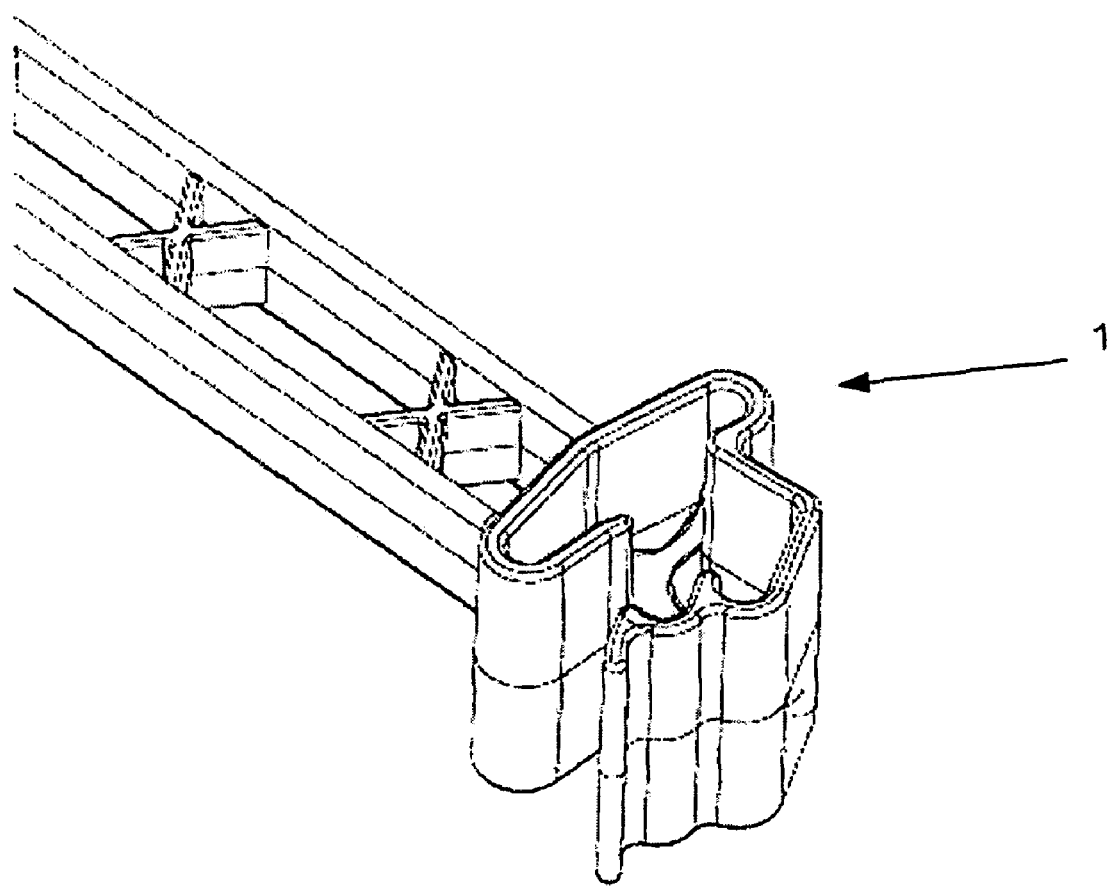
FIG. 3 shows a perspective view of the same connector of FIG. 2.

FIG. 3 shows a perspective view of the connector 1. From this view it can be seen that the main body 5 of the connector 1 has a relatively constant cross section over its depth. This feature provides the connector 1 with a better grip on the post in terms of sliding down the post and also provides a greater resistance to rotating forces or movement.

The connector may be formed from a resilient plastic material chosen to allow the main body 5 of the connector to be stressed into a suitable shape when it is being affixed and to provide resilient force to hold the contact surfaces against respective parts of the various T-posts. The material chosen may also provide electrical insulation of a wire in relation to the post 2. It will be understood by those skilled in the art that only some parts of the connector 1 need to be resilient and that only some parts of the wire fastener 3, connector 1 or cantilever member 4 need to be insulating.

Aspects of the present invention have been described by way of example only and it should be appreciated that modifications and additions may be made thereto without departing from the scope thereof as defined in the appended claims.

The invention claimed is:

1. A connector adapted to engage with a support member, said support member including at least three divergent arms, the connector configured in use to engage with each of the at least three divergent arms of the support member at the same time, the connector including:
   a main body;
   a first engagement section in the form of a first recess in the main body adapted to engage a first arm of the support member;
   a second engagement section in the form of a second recess in the main body adapted to engage a second arm of the support member;
   a third engagement section in the form of a third recess in the main body adapted to engage a third arm of the support member; and
   a fourth engagement section in the form of a fourth recess in the main body adapted to engage the third arm of the support member when said third arm is not engaged by the third engagement section; and
   wherein the first, second, third and fourth engagement sections are positioned sequentially on the main body of the connector.

2. The connector of claim 1, wherein the connector is adapted to engage a T-post.

3. The connector of claim 1, wherein the second and third engagement sections are separated by an adjustment section formed from a resilient material, the adjustment section being deformable to adjust the distance between the second and third engagement sections.

4. The connector of claim 1, including a lead-in tab at an extremity of the connector.

5. The connector of claim 1, including a bearing section between the second and third engagement sections, the bearing section being adapted to bear against the second arm of the support member.

6. The connector of claim 1, including a cantilever section which projects away from a support member engaged with the connector.

7. The connector of claim 6, including a wire attachment at an end of the cantilever section capable of attaching a wire to the cantilever section to mount the wire cantilevered from the connector.

8. The connector of claim 3, wherein the adjustment section includes at least two angled sections.

9. The connector of claim 8, including a bracing section disposed between the second engagement section and the adjustment section.

10. The connector of claim 1, wherein the third and fourth engagement sections are concave substantially towards the second engagement section when the connector is engaged with a support member.

11. The connector of claim 1, wherein the connector is formed from an electrically insulating material.

12. The connector of claim 1, wherein at least a portion of the connector is formed from a resilient material.

13. The connector of claim 12, wherein the resilient material is a plastics material.

14. A wire connector adapted to connect a wire to a support member, said support member including at least three divergent arms, the connector configured in use to engage with each of the at least three divergent arms of the support member at the same time, the connector including:
   a wire fastener adapted to locate a wire relative to the connector;
   a first engagement section adapted to engage a first arm of the support member;
   a second engagement section adapted to engage a second arm of the support member;
   a third engagement section adapted to engage a third arm of the support member; and
   a fourth engagement section adapted to engage the third arm of the support member when said third arm is not engaged by the third engagement section;
   wherein the first, second, third, and fourth engagement sections are positioned sequentially on the connector.

15. The connector of claim 14, wherein the wire fastener is formed from a cantilevered section which projects away from a support member when engaged by the connector.

16. The connector of claim 14, wherein at least a portion of the connector is formed from an electrically insulating material.

* * * * *